United States Patent [19]

Akima et al.

[11] Patent Number: 5,485,901
[45] Date of Patent: Jan. 23, 1996

[54] ELECTROMAGNETIC BRAKE

[75] Inventors: Hideo Akima; Yoshikiyo Ishikura; Takaaki Kishi, all of Yamato, Japan

[73] Assignees: Fujitsu Ltd., Kawasaki; Tokyo Buhin Kogiyo Co., Ltd., Kanagawa, both of Japan

[21] Appl. No.: 768,659

[22] PCT Filed: Feb. 14, 1991

[86] PCT No.: PCT/JP91/00177

§ 371 Date: Oct. 11, 1991

§ 102(e) Date: Oct. 11, 1991

[87] PCT Pub. No.: WO91/12657

PCT Pub. Date: Aug. 22, 1991

[30]  Foreign Application Priority Data

Feb. 14, 1990 [JP] Japan .................. 2-034871
Feb. 14, 1990 [JP] Japan .................. 2-034872

[51] Int. Cl.⁶ .................................................. H02P 15/00
[52] U.S. Cl. .................................... 188/164; 188/156
[58] Field of Search ............................ 188/155–165, 188/204 R; 303/100

[56]  References Cited

U.S. PATENT DOCUMENTS

| | | | |
|---|---|---|---|
| 3,689,778 | 9/1972 | Sharp | 303/97 |
| 3,704,769 | 12/1972 | Spencer | 188/164 X |
| 3,837,442 | 9/1974 | Baermann | 188/165 |
| 4,050,743 | 9/1977 | Knight | 303/118.1 |
| 4,131,325 | 12/1978 | Bayliss | 303/93 |
| 4,164,987 | 8/1979 | Lagarde | 188/156 |
| 4,305,485 | 12/1981 | Dubreucq | 188/164 |
| 4,853,573 | 8/1989 | Wolcott et al. | 188/164 |
| 5,023,499 | 6/1991 | Kuwahara | 188/164 |

FOREIGN PATENT DOCUMENTS

| | | | |
|---|---|---|---|
| 2389267 | 11/1978 | France . | |
| 3108732 | 9/1982 | Germany . | |
| 3426216 | 1/1986 | Germany | 188/164 |
| 58-75403 | 5/1983 | Japan . | |
| 1-303100 | 12/1989 | Japan . | |

*Primary Examiner*—Matthew C. Graham
*Attorney, Agent, or Firm*—Staas & Halsey

[57] ABSTRACT

An electromagnetic brake comprises a plurality of electromagnetic coils disposed on a stationary part of a drive force supply unit and producing a magnetic field in response to energizing currents supplied thereto, a rotor made of a conductive material and disposed on a rotary shaft of the drive force supply unit and positioned so as to rotate in the magnetic field and produce an eddy current in the rotor. The eddy current converts the rotational energy imparted to the rotor through the shaft into heat and generates a breaking force. A switching unit connected to the electromagnetic coils selectively controls the flow of energizing current to the coils in accordance with switching data supplied thereto by a control unit, responsive to external control data, for selectively controlling the ON/OFF ratio of energizing current flow to the electromagnetic coils.

4 Claims, 12 Drawing Sheets

5,485,901

ELECTROMAGNETIC BRAKE

FIELD OF THE INVENTION

This invention relates to an electromagnetic brake, and particularly to a brake having a function of rotating a rotor made of a conductive material in a magnetic field to thereby cause an eddy current in the rotor, the eddy current converting the rotational energy into heat to produce a braking torque, and the converted heat being radiated.

DESCRIPTIONS OF RELATED ART

As engine functions and expressways are improved, large- and middle-sized trucks frequently run at high speeds for long distances, and to reduce a load on a main brake, the braking torque of which is controlled by a liquid pressure, an auxiliary brake such as an electromagnetic brake is employed.

The electromagnetic brake must not cause a driver discomfort when changing the braking torque in a stepwise manner by changing the number of energized electromagnetic coils, but must provide smooth braking characteristics by controlling the current flowing to the electromagnetic coils.

According to a conventional electromagnetic brake, the temperature of a rotor can become higher than 600° C., depending on operating conditions such as an inclination of a road, an operating time, and the load, and this high temperature has an adverse affect on the periphery of, and thus deforms, the rotor.

To solve this problem, there must be provided a brake that achieves smooth braking characteristics by controlling the temperature of a rotor and current flowing to electromagnetic coils, and prevents an excessive increase of the temperature of the rotor.

FIG. 1 is a schematic view showing a conventional electromagnetic brake.

In FIG. 1, the electromagnetic brake used for a large- or middle-sized vehicle comprises, for example, eight electromagnetic coils (L1 to L8) 2 disposed on the stationary side of a transmission of an engine 1, a rotary drum 3 disposed on a propeller shaft 3a for transmitting a torque to wheels 6, a relay circuit 4 including relays RL1 to RL8 connected to the coils 2 respectively, a mode selection switch 5 selected by a driver, a main relay SW9 for turning ON and OFF a current flowing to the relay circuit 4, and a foot switch 9 provided for a foot brake 7.

The functions of this brake are explained as follows. When the driver determines that a main brake is under an excessive load because the vehicle is running, for example, on a downward slope, or that the electromagnetic brake alone is sufficient, the driver selects switches SW1 to SW8 of the mode selection switch 5, and pushes the foot brake 7 to turn ON the foot switch 9 anti main relay SW9, and accordingly, the relays RL1 to RL8 of the relay circuit 4 corresponding to the selected switches 5 are turned ON to magnetize the corresponding electromagnetic coils 2.

As a result, the rotor 3 is rotated in magnetic fields produced by the magnetic coils 2, and an eddy current flows in the rotor 3 to produce Joule heat that generates a braking torque for braking the vehicle.

When the conventional electromagnetic brake is used with the main brake, the driver must select the switches SW1 to SW8 of the mode selection switch 5 whenever the driving condition such as running on a downward slope is changed, and this may raise the following problems:

(1) When initially all of the switches SW1 to SW8 are ON and then the switches SW1 to SW4 are turned OFF in response to a change in the driving condition, to reduce the number of active electromagnetic coils 2, a braking torque Dτ is changed stepwise as indicated by the braking torque characteristic curve of FIG. 2, and as a result, the driver has a feeling of discomfort.

(2) Specific coils among the electromagnetic coils 2 are frequently used, and therefore, these coils often reach an operating temperature limit.

Further, according to the prior art, all of the switches SW1 to SW8 may be turned ON and used for a long time, depending on the driving condition, and thus the temperature of the rotor 3 may sometimes become higher than 600° C., depending on an inclination of a road, operating conditions, and load, etc.

As a result, a first problem arises in that the periphery of the brake is heated and the rotary drum 3 is deformed.

When all of the electromagnetic coils are ON, the mode selection switch 5 may be operated due to a change in the driving conditions, to select specific coils from among the electromagnetic coils to thereby reduce the braking torque, and thereafter, all of the electromagnetic coils may be again turned ON to increase the braking torque. If these operations are repeated, the specific electromagnetic coils will be overheated.

SUMMARY OF THE INVENTION

To solve these problems of the prior art, a first object of the present invention is to provide an electromagnetic brake that achieves smooth braking characteristics by controlling the current flowing to the electromagnetic coils to eliminate any discomfort, and reduces the number of relays required for increasing or reducing the number of energized electromagnetic coils.

A second object of the invention is to provide an electromagnetic brake wherein the temperature of a rotor and a current flowing to electromagnetic coils are controlled without changing the number of energized electromagnetic coils, thereby minimizing the influence of heat on the periphery of the brake, and a corresponding deformation of the rotor.

To achieve the objects mentioned above, a first aspect of the present invention provides an electromagnetic brake for rotating a rotor made of a conductive material in a magnetic field, to thereby produce an eddy current in the rotor, the eddy current converting the rotational energy into heat to thus generate a braking torque. The electromagnetic brake comprises a plurality of electromagnetic coils disposed on the stationary side of a drive force supply means, a rotor made of a conductive material and disposed on the rotary shaft side of the drive force supply means, a switching means connected to the electromagnetic coils, and a control means for providing the switching means with switching data according to external control data. The control means controls an ON/OFF ratio of the current flowing to the electromagnetic coils.

A second aspect of the invention provides an electromagnetic brake for rotating a rotor made of a conductive material in a magnetic field, to thereby produce an eddy current in the rotor, the eddy current converting the rotational energy into heat to thus produce a braking torque.

The electromagnetic brake comprises a plurality of electromagnetic coils arranged on the stationary side of a drive force supply means, a rotor made of a conductive material and arranged on a rotary shaft of the drive force supply means, a switching means connected to the electromagnetic coils, a speed detector for detecting a rotational speed of the rotary shaft of the drive force supply means and providing speed data, at least one of a first temperature detector for detecting the temperature of the electromagnetic coils and providing first temperature data, and a second temperature detector fitted in the vicinity of the rotor for detecting the ambient temperature around the rotor, a storage means for storing a table of operating temperature limit data of the rotor, and a control means for controlling inputs and outputs of the switching means, speed detector, at least one of the first and second temperature detectors, and the storage means.

From the speed data and at least one of the first and second temperature data, the control means estimates an ambient temperature corresponding to an operating temperature limit of the rotor, and thereafter, provides the switching means with required switching data.

DESCRIPTION OF THE PREFERRED EMBODIMENTS

Figure 1:
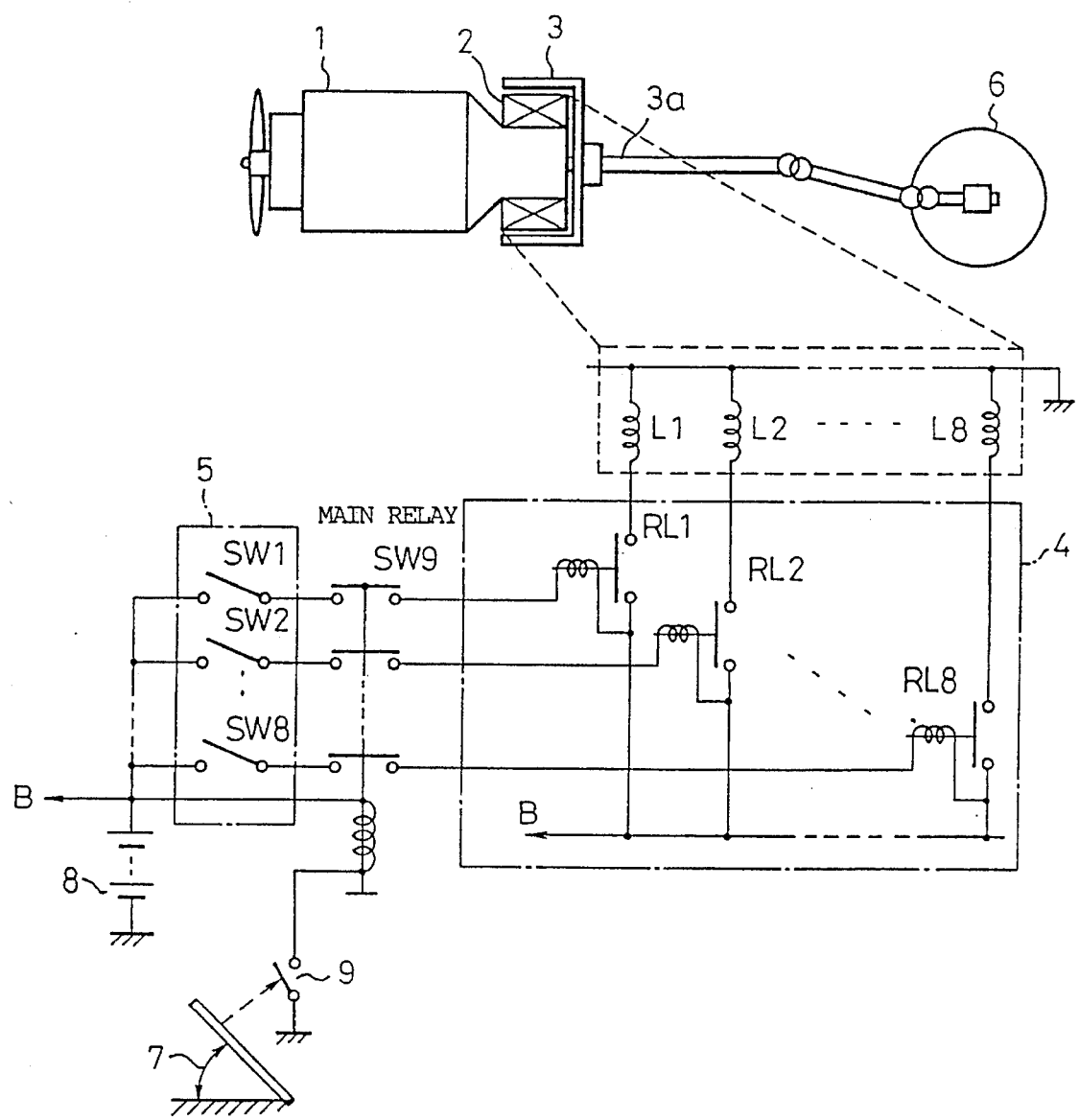
FIG. 1 is a schematic view showing an electromagnetic brake according to the prior art.
Figure 2:
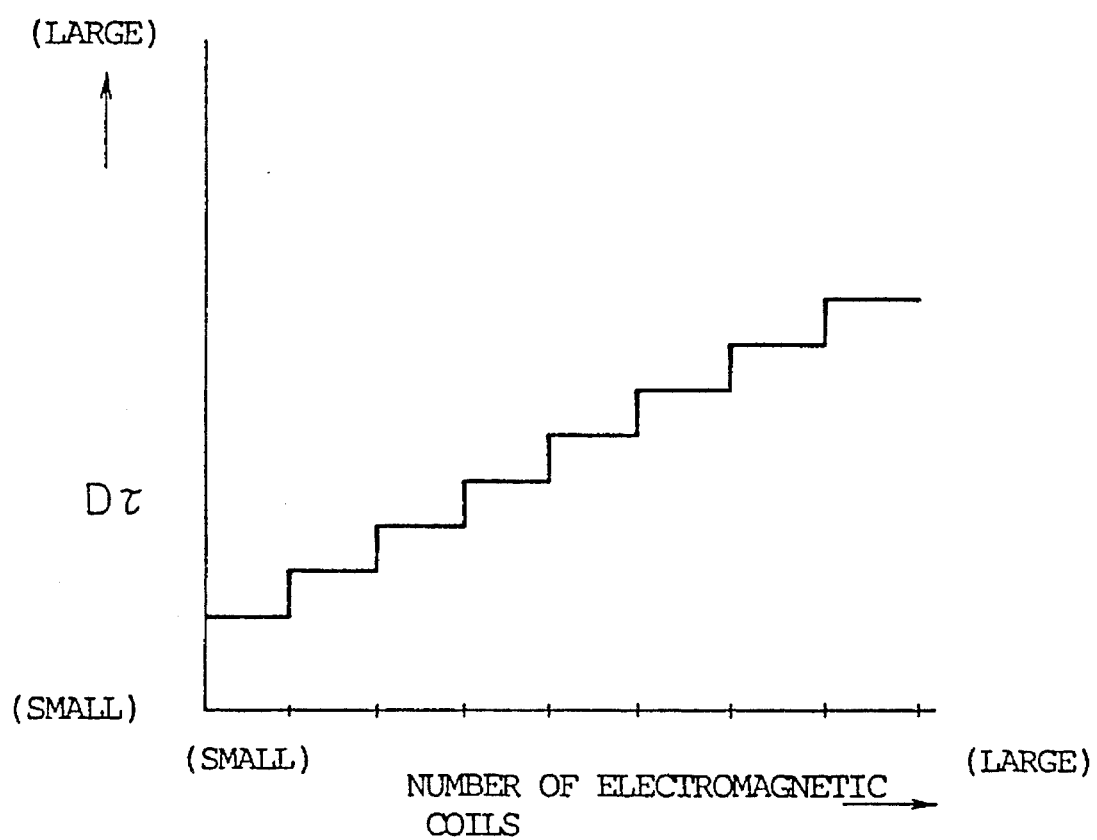
FIG. 2 is a characteristic diagram of a braking torque, for explaining the problem of the prior art.
Figure 3:
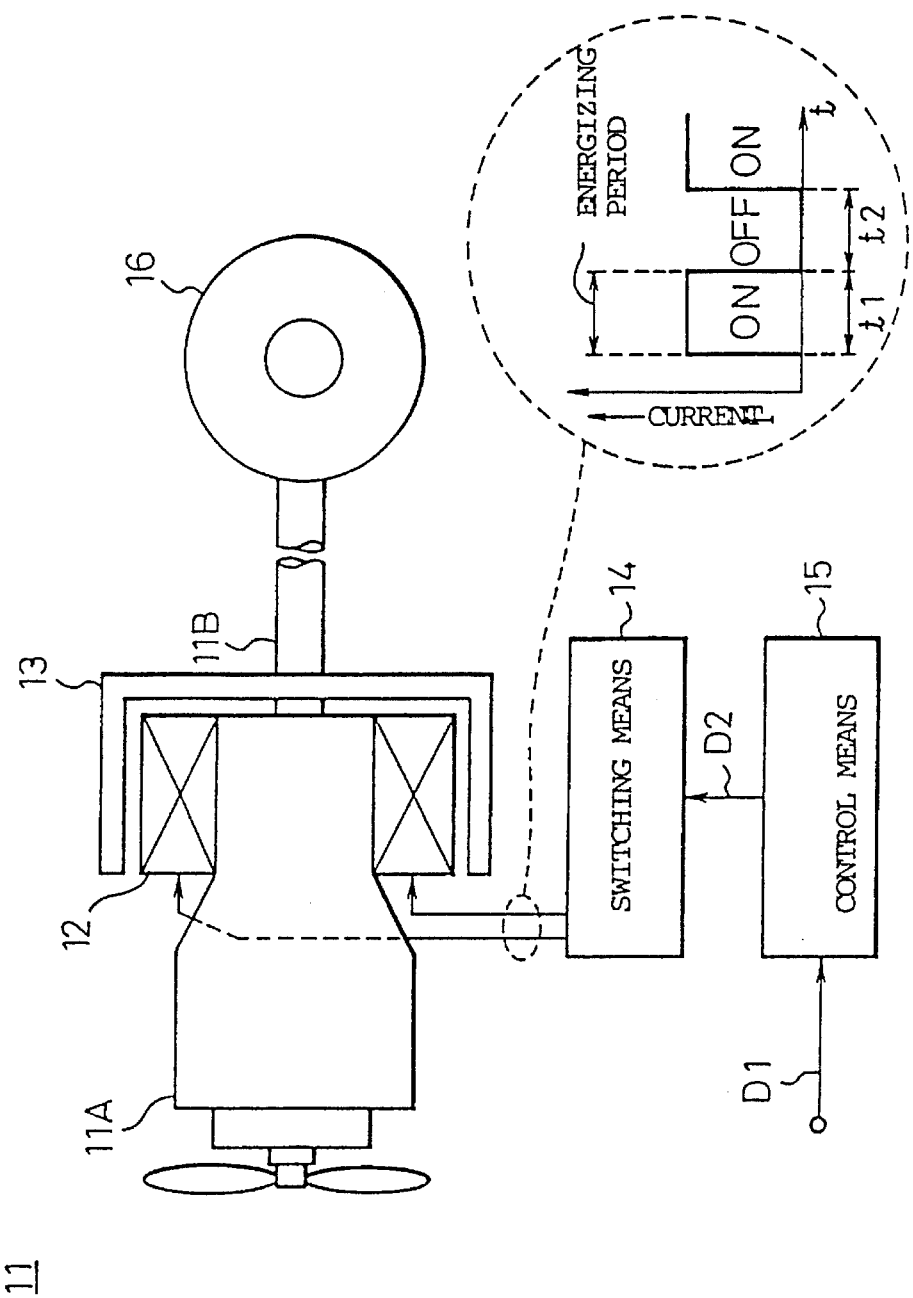
FIG. 3 is a view showing an electromagnetic brake according to a first embodiment of the invention.

FIG. 3 shows a first embodiment of the electromagnetic brake of the invention.

In this electromagnetic brake, a rotor 13 made of a conductive material is rotated in a magnetic field to thereby produce an eddy current in the rotor, and the eddy current converts the rotational energy into heat to thus produce a braking torque. The electromagnetic brake comprises a plurality of electromagnetic coils 12 disposed on a stationary portion 11A of a drive force supply means 11, the rotor 13 made of a conductive material and disposed on a rotary shaft 11B of the drive force supply means 11, a switching means 14 connected to the electromagnetic coils 12, and a control means 15 for providing the switching means 14 with switching data D2 according to external control data D1. The control means 15 controls the ON/OFF ratio of the current flowing to the electromagnetic coils 12.

According to this embodiment, the control means 15 automatically controls the ON/OFF ratio of the current flowing to the electromagnetic coils 12. When the external control data D1 is provided in response to a change in a driving condition, such as running on a downward slope, to the control means 15, the control means 15 provides the switching data D2 to the switching means 14, and according to the data D2, the switching means 14 controls the ON/OFF ratio of the currents to the electromagnetic coils.

Unlike the prior art wherein electric circuits of the electromagnetic coils 12 are individually opened, the embodiment of the invention changes the ON/OFF ratio of the current to the electromagnetic coils through the switching means 14 while keeping all circuits of the coils closed, to thereby control the braking torque in a stepless manner.

This arrangement averages the load on the respective electromagnetic coils 12, realizes a uniform temperature distribution in the electromagnetic coils 12, and suppresses the operating temperature of the electromagnetic coils.

Further, the embodiment does not require the relays RL1 to RL8 having a large capacity for disconnecting the large current of the prior art, and this reduces the weight of the electromagnetic brake of the embodiment. Furthermore, the embodiment provides smooth braking characteristics and thus does not cause any discomfort to the driver when braking the vehicle.

Figure 4:
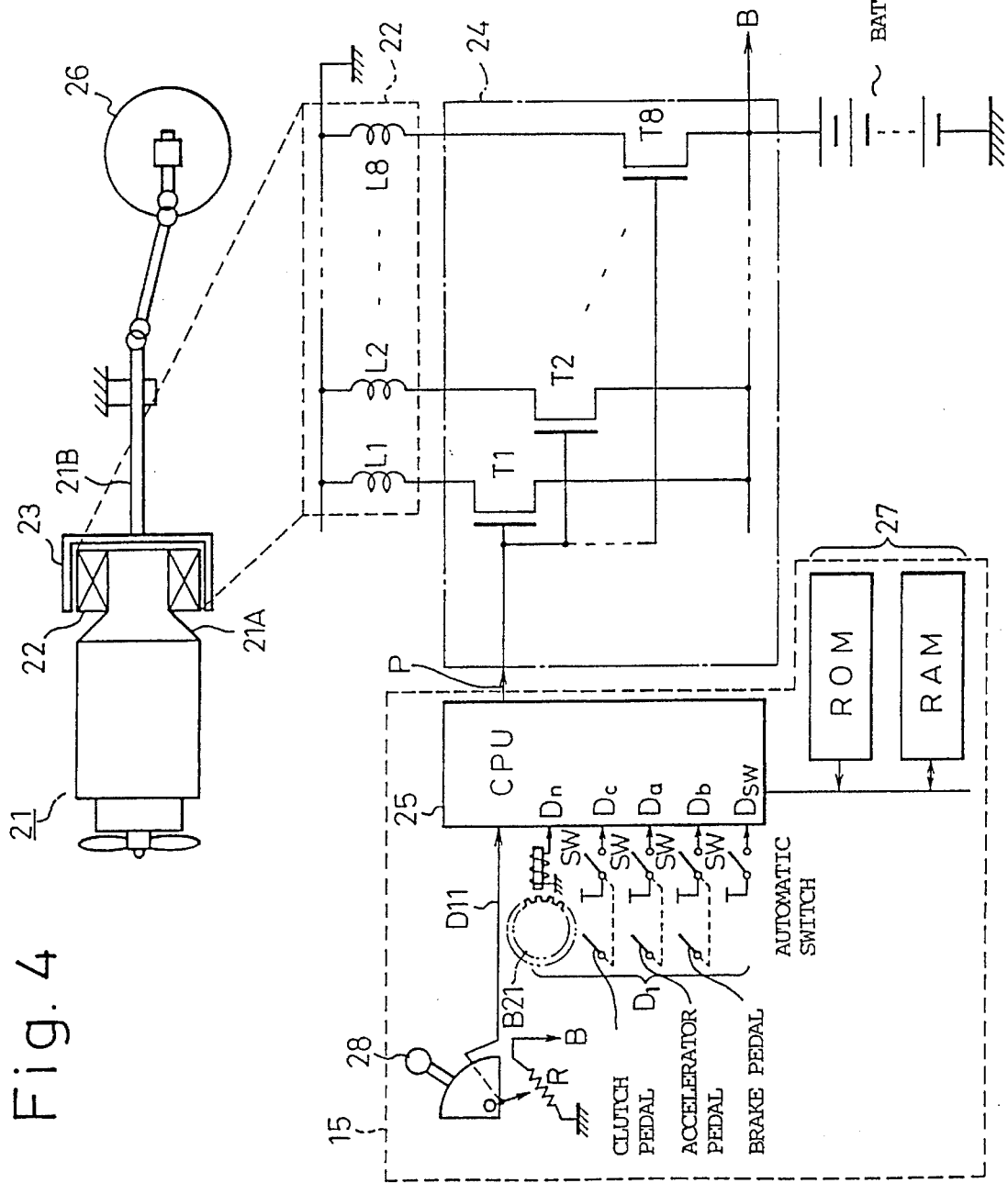
FIG. 4 is a schematic view showing the electromagnetic brake according to the embodiment of FIG. 3.

FIG. 4 shows a first embodiment of the invention. This embodiment includes eight coils, but the number of the coils is not limited. This embodiment also includes a switching means 24 comprising MOS transistors, but the switching means is not limited to this arrangement but may be realized by any means that can properly and optionally obtain a high speed change of the duty ratio of a current flowing to the coils, within the scope of the invention. For example, the switching means may comprise bipolar transistors instead of MOS transistors. This embodiment further includes a duty ratio control means implemented by software, i.e., a program stored in a ROM, etc., but this may be implemented by hardware.

The first embodiment of the invention will be explained with reference to the drawings.

Figure 5:
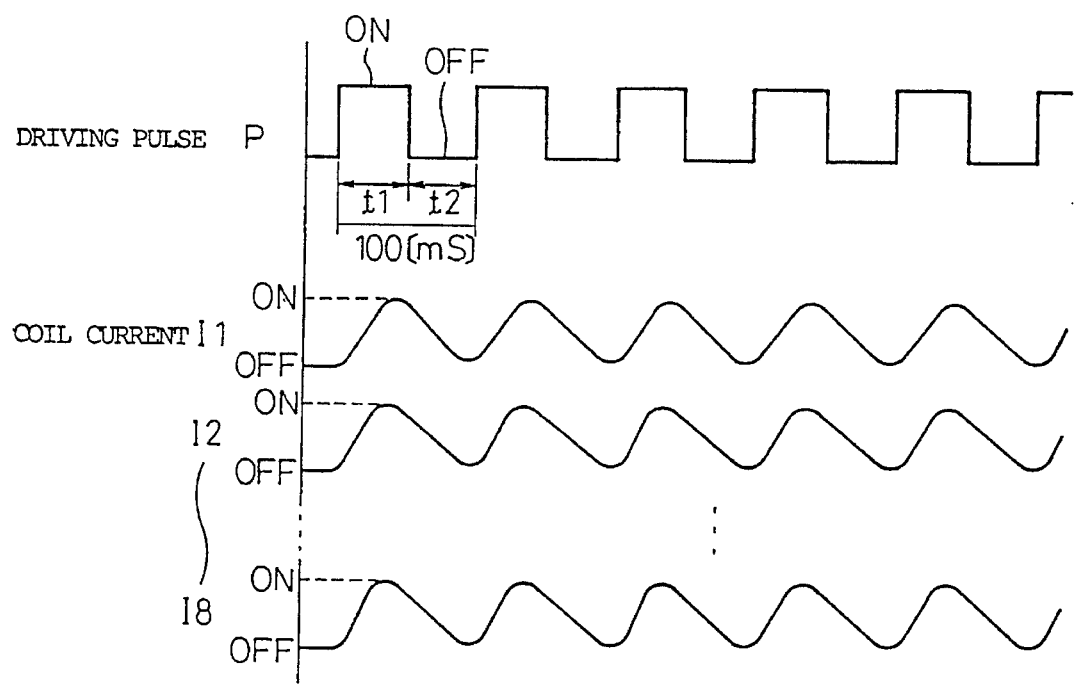
FIG. 5 is a time chart showing an operation of the electromagnetic brake according to the embodiment of FIG. 3.
Figure 6:
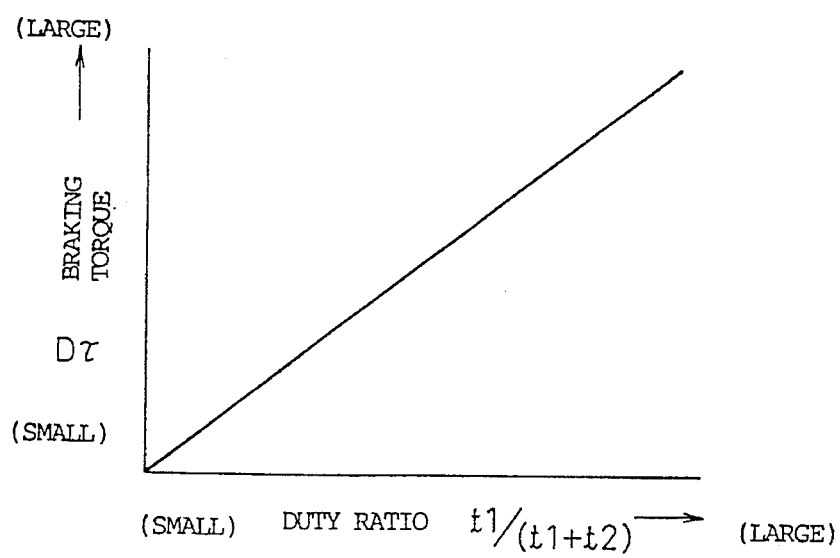
FIG. 6 is a characteristic diagram showing the braking torque of the electromagnetic brake according to the embodiment of FIG. 3.

FIGS. 4 to 6 are views explaining the electromagnetic brake according to the first embodiment, in which FIG. 4 is a schematic view showing same.

In the figure, numeral 21 is an engine as an example of the drive force supply means used for supplying a drive force to wheels 26 of a large- or middle-sized truck.

Numeral 22 denotes a solenoid, as an example of the electromagnetic coil 12 of FIG. 3, disposed on the rear side of a stationary portion 21A of a transmission of the engine 21. According to the embodiment, eight solenoids (L1 to L8) 22 are disposed at respective positions displaced by intervals of 45°. Numeral 23 denotes a rotary drum as an example of the rotor made of a conductive material and fitted to a propeller shaft 21B for transmitting a drive force from the engine 21 to the wheels 26. The rotary drum 23 has a cylindrical shape surrounding the propeller shaft 21B as a center axis thereof, to thus cover the solenoids 22, so that the solenoids 22 and drum 23 constitute a magnetic circuit with a gap therebetween.

Numeral 24 denotes a switching circuit as an example of the switching means 14 of FIG. 3, and comprises switching transistors T1 to T8 connected to the solenoids L1 to L8, respectively. The transistors T1 to T8 are field effect transistors.

Numeral 25 denotes a CPU as an example of the control means for receiving external control data D1 in FIG. 3, such as lever selection data D11, rotational speed data Dn, brake data Db, clutch data Dc, accelerator data Da, and automatic switch data Dsw, etc., and providing a drive pulse P to the switching circuit 24.

According to this first embodiment, the switching means is controlled according to the control data mentioned above, but all of the control data is not always needed and at least one thereof may be selected as and when needed.

In this embodiment the rotational speed of the propeller shaft is detected and used as the control data because the braking torque is changed when the rotational speed of the propeller shaft is changed, even if the duty ratio is not changed, and thus the rotational speed of the propeller shaft is necessary for obtaining a proper braking torque. When it is detected that the vehicle has stopped (when the rotational speed of the propeller shaft is zero), the electromagnetic brake is turned OFF. The accelerator data is used as the control data because the brake should not operate when the accelerator is operated to accelerate the vehicle. Namely, while the accelerator is being operated the electromagnetic brake should not be operated, and therefore, while the accelerator is operating the switching means 14 is completely turned OFF, or an OFF time of the duty ratio is prolonged as required.

The clutch data is used as the control data because the clutch is disconnected and the accelerator released when changing the speed of the vehicle by changing a gear, i.e., a gear shift-up. At this time, if the electromagnetic brake is ON, acceleration is prevented, and accordingly, the electromagnetic brake is switched OFF when the clutch is disconnected.

Therefore, the electromagnetic brake must be turned OFF when the clutch is disconnected. Accordingly, the automatic switch data Dsw is supplied from a switch to determine whether or not a main brake of the vehicle is interlocked with the electromagnetic brake. When the automatic switch is ON, the electromagnetic brake is activated synchronously with the foot brake, to provide a stronger braking force. When the automatic switch is OFF, however, the braking force of the electromagnetic brake is produced in response to the position of a selection lever 28. Note, even if the automatic switch is OFF, it is preferable to interlock the drive pulse with the accelerator and clutch pedal. For example, when the vehicle is running at a low speed and the accelerator pedal and clutch pedal are depressed, the electromagnetic brake is stopped, and when these operations cease, the braking control is restarted.

Numeral 26 denotes wheels controlled by the electromagnetic brake. When the main brake controlled by liquid pressure is under an excessive load due to the driving condition of the vehicle, the electromagnetic brake is used simultaneously to brake the wheels 26.

Numeral 27 denotes other circuits such as a ROM (read only memory) for storing programs for the CPU and a RAM (random access memory) for temporarily storing the control data. According to this embodiment, the ROM stores a program for controlling the duty ratio, and the RAM stores an operation program for calculating the duty ratio $t1/(t1+t2)$.

Numeral 28 denotes the electromagnetic brake adjusting lever, which is selected by the driver and provides the CPU 25 with lever selection data D11. The lever 28 is interlocked with a variable resistor R to provide a stepless generation of an analog voltage.

One end of the variable resistor R is grounded and the other end thereof is connected to a terminal B of the switching circuit 24, and accordingly, when the position of the adjusting lever 28 is changed, an analog voltage input to the CPU 25 is changed, and as a result, the duty ratio of the drive pulse provided by the CPU 25 to the switching circuit 24 is changed.

The electromagnetic brake according to the first embodiment of the invention is constituted as described above.

Next, an operation of this brake will be explained.

FIG. 5 is a time chart showing the operation of the electromagnetic brake according to the first embodiment of the invention. The CPU 25 (of FIG. 4) recognizes the driving condition of the vehicle according to the rotational speed of the propeller shaft, the state of the brake, the connecting state of the clutch, and the state of the accelerator, and provides the drive pulse P to the switching circuit 24. When the period of the drive pulse P is about 100 ms, a duty ratio $t1/(t1+t2)$ with an ON time t1 and an OFF time t2 of the period is set by the CPU 25.

The duty ratio $t1/(t1+t2)$ is determined according to the position of the adjusting lever 28 selected by the driver. If the driver wants to increase the effect of the electromagnetic brake, the driver changes the position of the adjusting lever to increase the duty ratio $t1/(t1+t2)$ and prolong the ON time of the pulse P. On the other hand, if the driver wants to reduce the effect of the electromagnetic brake, the driver reduces the duty ratio $t1/(t1+t2)$ of the drive pulse P to prolong the OFF time of the pulse P.

Thereafter, the drive pulse P with the duty ratio $t1/(t1+t2)$ is applied to gates of the switching transistors T1 to T8, and as a result, the coil currents I1 of I8 to the solenoids L1 to L8, respectively, are controlled according to the duty ratio $t1/(t1+t2)$. At this time, the rotary drum 23 rotates in magnetic fields produced by the electromagnetic coils 22, to thereby cause an eddy current in the drum 23 and generate Joule heat, and this produces a braking torque which is applied to the vehicle.

FIG. 6 is a characteristic diagram showing the electromagnetic brake according to the first embodiment of the invention. In the figure, the ordinate represents the braking torque $D\tau$, and the abscissa represents the duty ratio. Compared with the prior art, wherein the number of the electromagnetic coils is increased or reduced to control braking torque, the present invention controls the duty ratio to produce a stepless change of the braking torque $D\tau$ according to a linear function.

Accordingly, the CPU 25 of the embodiment controls the energizing period (i.e., the period of energization) of the electromagnetic coil 22 comprising the eight solenoids L1 to L8.

When the rotational speed data Dn, brake data Db, clutch data Dc, acceleration data Da, and lever selection data D11 are provided, in response to a change in the driving condition, to the CPU 25, the CPU 25 provides the switching circuit 24 with the drive pulse P corresponding to the switching data D2. Then, according to the data D2, the switching circuit 24 controls the energizing period of the coil currents I1 to I8 flowing to the eight solenoids L1 to LB, respectively.

Unlike the prior art which individually opens electric circuits of, for example, eight solenoids L1 to L8 and transistors T1 to T8, the invention keeps all circuits closed and carries out a stepless control of the braking torque through the switching circuit 24.

As a result, the loads on the solenoids L1 to L8 are averaged, and the temperatures of the solenoids are not individually abnormally increased, and thus, since a uniform temperature distribution is realized, the operating temperature of the solenoids is kept low.

The relays RL1 to RL8 having a large capacity for disconnecting a large current employed in the prior art are not required by the invention, and thus the weight of the brake is reduced. Further the invention achieves smooth braking characteristics, and thus the driver is not subjected to any discomfort during the braking.

A flow of the duty ratio control operation 10 carried out in the CPU of the invention will be explained with reference to the flowchart of FIG. 7. At Step (a) the rotational speed data Dn is read and it is determined whether or not a rotation pulse has been received. If the rotation pulse has not been received, it is determined that the vehicle has stopped, and in Step (j) the CPU no longer provides the drive pulse P. Namely, the OFF time of the pulse is prolonged. If the rotation pulse has been received, at Step (b) the clutch data Dc is read and it is determined whether or not a clutch switch SW is open. If the clutch open data is received, it is determined that the clutch switch SW is closed, i.e., the clutch pedal is depressed, and accordingly, the drive pulse is not output at Step (j).

When it is determined at Step (b) that the clutch switch SW is open, at Step (c) the accelerator data Da is read and it is determined whether or not an accelerator switch SW is open. When accelerator data is received, it is determined that the accelerator switch SW is closed, i.e., the accelerator pedal is depressed, and accordingly, the drive pulse is not output at Step (j).

If it is determined at Step (c) that the accelerator switch SW is open, at Step (d) the automatic switch data Dsw is read and it is determined whether or not an automatic switch SW is open. If no automatic switch data Dsw is received, it is determined that the automatic switch SW is open, whereby the next step is skipped and Step (f) is carried out.

If it is determined at Step (d) that the automatic switch SW is closed, at Step (e) the brake data Db is read and it is determined whether or not a brake switch SW is open. If no brake data Db is received, it is determined that the brake switch SW is open, i.e., the brake pedal is not depressed, and accordingly, the drive pulse is not output at Step (j).

If it is determined at Step (e) that the brake switch SW is closed, Step (f) is carried out.

At Step (f) it is determined whether or not an output voltage of the lever selection data D11 is zero, and if it is zero, it is determined that the electromagnetic brake is not operating, and the drive pulse is not output at Step (j).

If it is determined at Step (f) that the output voltage of the lever selection data D11 is not zero, at Step (g) the analog voltage value of the lever selection data D11 is detected.

Thereafter, at Step (h) a sum (t1+t2) of the ON time t1 and OFF time t2 of the driving pulse P is set to a predetermined value (fixed) and the duty ratio (t1/(t1+t2)) is changed in response to the analog voltage value. For example, if the analog voltage value is high, the duty ratio is increased by individually calculating the ON time t1 and OFF time t2, and when the analog voltage value is low, the duty ratio is reduced by individually calculating the ON time t1 and OFF time t2. Then, at Step (i), a drive pulse having a duty ratio which has been changed in accordance with a result of the calculation is provided.

A second embodiment of the invention will be explained.

Figure 8:
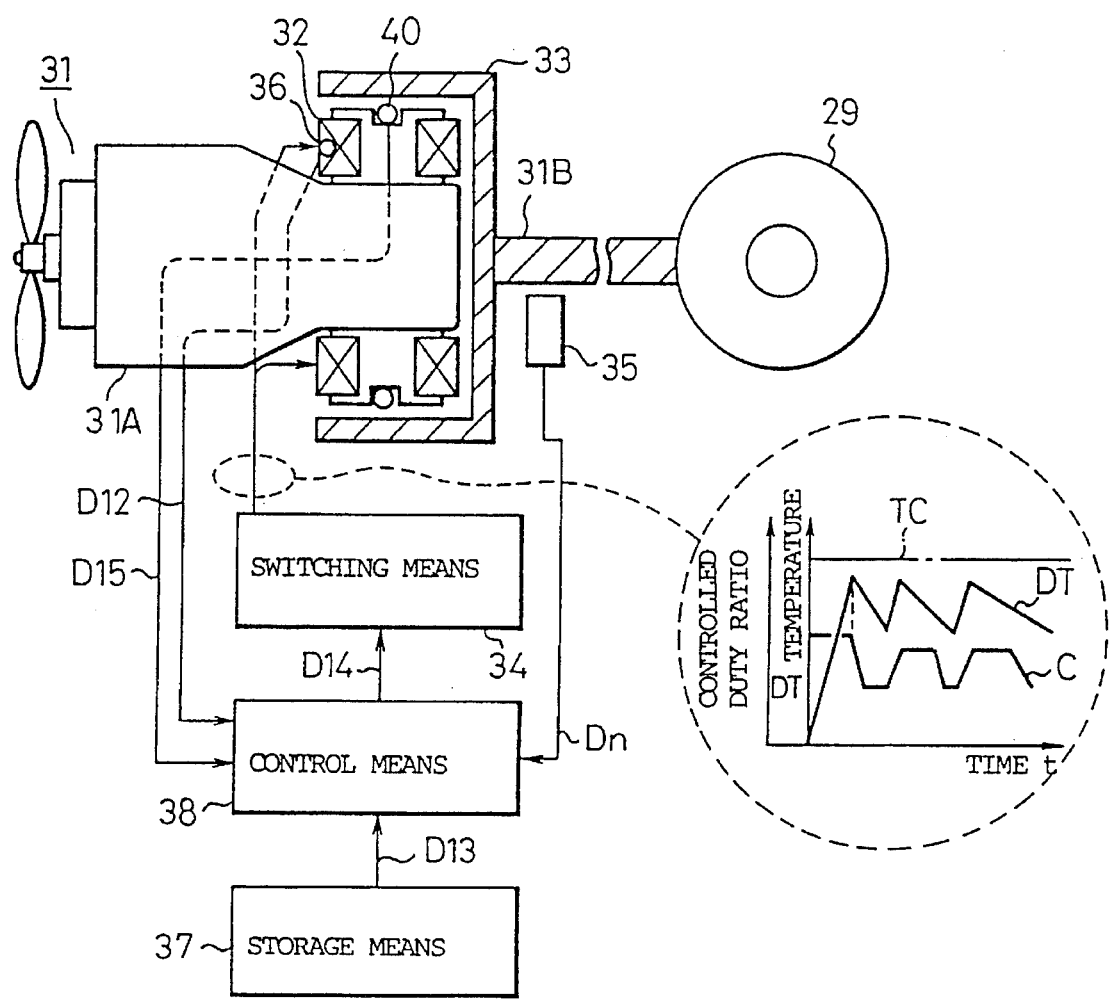
FIG. 8 is a view showing an electromagnetic brake according to a second embodiment of the invention.

FIG. 8 is a view showing an electromagnetic brake according to the second embodiment of the invention.

In this electromagnetic brake, a rotor 33 made of a conductive material is turned in a magnetic field, and an eddy current is caused to flow in the rotor 33 to thereby convert the rotational energy into heat, and thus produce a braking torque.

The electromagnetic brake comprises a plurality of electromagnetic coils 32 disposed on a stationary portion 31A of a drive force supply means 31, the rotor 33 made of conductive material and disposed on a rotary shaft 31B of the drive force supply means 31, a switching means 34 connected to the electromagnetic coils 32, a speed detector 35 for detecting the rotational speed of the rotary shaft 31B of the drive force supply means 31 and providing speed data Dn; a first temperature detector 36 for detecting the temperature of the electromagnetic coils 32 and providing first temperature data D12, a second temperature detector 40 fitted in the vicinity of the rotor 33 for detecting an ambient temperature around the rotor 33 and providing second temperature data D15, a storage means 37 for storing a table of operating a temperature limit data D13 of the rotor 33, and a control means 38 for controlling the inputs and outputs of the switching means 34, speed detector 35, first and second temperature detectors 36 and 40, and storage means 37.

The control means 38 estimates an ambient temperature D16 corresponding to the operating temperature limit of the rotor according to at least the speed data Dn, and first and second temperature data D12 and D15, and provides the switching means 34 with switching data D14.

The control means 38 refers to the table D13 of operating temperature limit data according to at least the speed data Dn and temperature data D12, estimates the operating ambient temperature limit (i.e., data D16) of the rotor 33, compares the ambient temperature limit data with the second temperature data D15, and provides the switching means 34 with the switching data D14 so that the actual operating temperature of the rotor 33 does not exceed the limit value.

When the speed data Dn and temperature data D12 are provided to the control means 38 in response to a driving condition such as a running on a downward slope and a load on the vehicle, the control means 38 provides the switching means 34 with the switching data D14, and according to the data D14, the switching means 34 controls the period of the current flowing to the electromagnetic coils 32.

Unlike the prior art, which individually opens the electric circuits for the electromagnetic coils 32, the invention keeps all circuits closed and carries out a stepless control of the braking torque so that the estimated operating temperature of the rotor 33 made of conductive material does not reach the operating temperature limit.

As a result, loads on the electromagnetic coils 32 are averaged, the influence of heat on the periphery of the drum is suppressed, and a predetermined shape of the rotor 33 is maintained.

In addition to the functions of the previous embodiment, the second embodiment detects data related to the ambient temperature on the inner surface of the rotor and the temperature of the coils, to thereby provide a more precise control and provide a proper braking torque. The ambient temperature of the rotor and the temperature of the coils are not necessarily detected at the same time, but at least one thereof can be used for this control.

According to the second embodiment of the invention, it is preferable to utilize detected data to control the ambient temperature of the rotor. Namely, when the electromagnetic brake is used for a long time, the rotor 33 is heated to a temperature of 700° C. to 800° C. or higher, and this may cause a fire, or distort the engine and bearings, etc. To avoid this, a manual according to the prior art stipulates that the brake must not be used for a long time, but this limits the range of use of the brake. According to the electromagnetic brake of the second embodiment, the temperature of the rotor is controlled so that it does not exceed a limit temperature TC of, for example, 550° C. In principle, when the temperature of the rotor reaches the limit temperature TC of 550° C., the duty ratio of the driving pulse is changed to extend the OFF time thereof, thereby reducing the heat quantity of the rotor and controlling the temperature of the rotor to a predetermined value.

A change in the temperature of the coils causes a change in an amount of torque generated, and accordingly, the generated torque can be estimated and controlled according to the temperature of the coils, and the temperature of the rotor can be controlled to a predetermined value. Further, when the temperature of the coils reaches a limit temperature (190° C.), the duty ratio must be changed to control the temperature of the coils so that it does not exceed the limit temperature. This second control is carried out before the rotor temperature control.

This embodiment uses the rotational speed data Dn, similar to the previous embodiment. The embodiment of the invention will be explained in detail with reference to FIG. 9.

Figure 9:
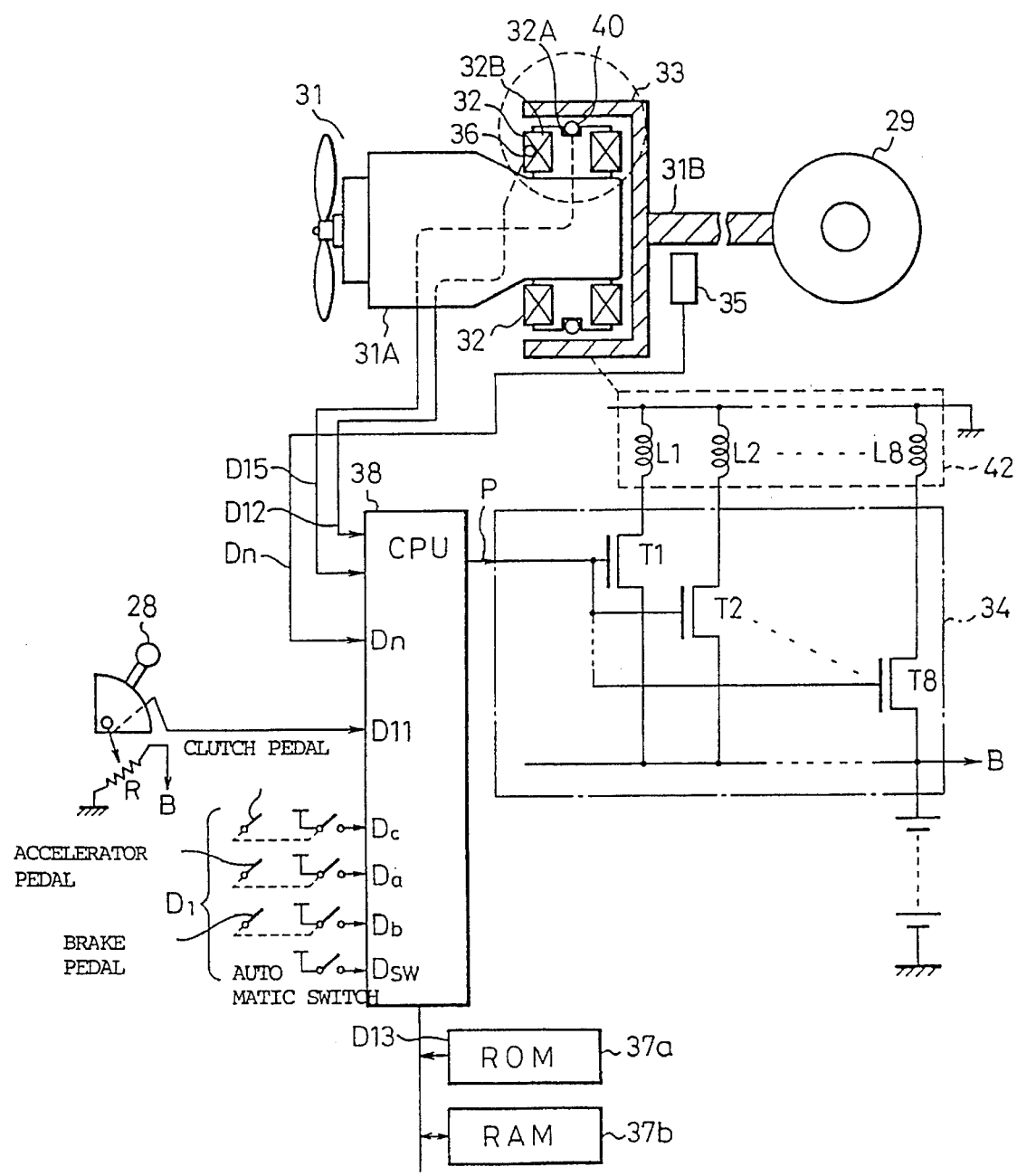
FIG. 9 is a schematic view showing the electromagnetic brake according to the second embodiment of FIG. 8.

In FIG. 9, numeral 31 denotes an engine as an example of the drive force supply means for supplying a drive force to wheels 29 of a vehicle.

Numeral 42 denotes solenoids L1 to L8 as an example of the electromagnetic coil 32 disposed on a stationary part 31A of the engine 31 in the rear of a transmission. In this embodiment, the electromagnetic coil 32 comprises eight solenoids (L1 to L8) respectively disposed at positions spaced by intervals of 45°.

Numeral 33 denotes a rotary drum as an example of the rotor made of a conductive material and fitted to a propeller shaft 31B for transmitting a power from the engine 31 to the wheels 29. The rotary drum 33 has a cylindrical shape and surrounds the propeller shaft 31B as a center axis thereof, to thus cover the electromagnetic coil 32. The electromagnetic coil 32 and rotary drum 33 constitute a magnetic circuit with a gap therebetween.

Numeral 34 denotes a switching circuit as an example of the switching means, comprising switching transistors T1 to T8 connected to the solenoids L1 to L8, respectively. The transistors T1 to T8 are field effect transistors.

Numeral 35 denotes a speed sensor for detecting the rotational speed of the propeller shaft 31B and providing vehicle speed data Dn.

Numeral 36 indicated in a dotted circle of the figure is a thermistor as an example of the first temperature detector, for detecting the operating temperature of a coil portion 32B of the electromagnetic coil 32.

Numeral 40 denotes a thermistor as an example of the second temperature detector, for detecting the temperature of the rotary drum 33. The thermistor 40 is thermally isolated from a core portion 32A of the electromagnetic coil 32 and disposed in the vicinity of the drum 33.

Numerals 37a and 37b denote memory circuits as examples of the storage means 37, and correspond to a ROM (read only memory) for storing programs for a processing unit (hereinafter referred to as the CPU) and a RAM (random access memory) for temporarily storing control data. In this embodiment, the ROM 37a stores a table of limit operation temperature data D13, which shows a relationship between the ambient temperature TC corresponding to the limit temperature of the control means 38 and the operating temperature of the coil portion 32B of the electromagnetic coil 32. This relationship will be explained later in detail with reference to FIG. 10.

Numeral 38 denotes the CPU as an example of the control means, for receiving the temperature data D15 and D12, speed data Dn, limit temperature data D13, and similarly to FIG. 4, other data such as the brake data Db, clutch data Dc, and accelerator data Da, and providing the switching circuit 34 with a drive pulse P. For example, when the speed of the vehicle becomes low, or when the accelerator and clutch pedals are depressed, the CPU stops the energizing period control of the electromagnetic brake, and when these states are changed, restarts the control.

Numeral 29 denotes wheels of the vehicle controlled by the electromagnetic brake. When a main brake controlled by liquid pressure is under an excessive load due to the driving condition of the vehicle, or when the electromagnetic brake alone is sufficient for braking, the electromagnetic brake is used with the main brake, or itself alone, to brake the wheels 29.

A method of controlling the electromagnetic brake according to the second embodiment of the invention according to the temperatures of the rotary drum and coils will be explained.

It is necessary to control the temperature of the rotary drum, as mentioned before, but as it is impossible to directly measure the temperature of the rotary drum, this invention estimates the same from an ambient temperature on the inner surface of the rotary drum, the temperature of the coils, and the rotational speed of the rotary drum.

For this purpose, the first temperature detector is directly arranged on the coil portion, and the second temperature detector is arranged in the vicinity of the inner surface of the rotary drum.

The detector for detecting the rotational speed of the rotary drum is similar to the rotary speed detector of the first embodiment of FIG. 4.

Figure 10:
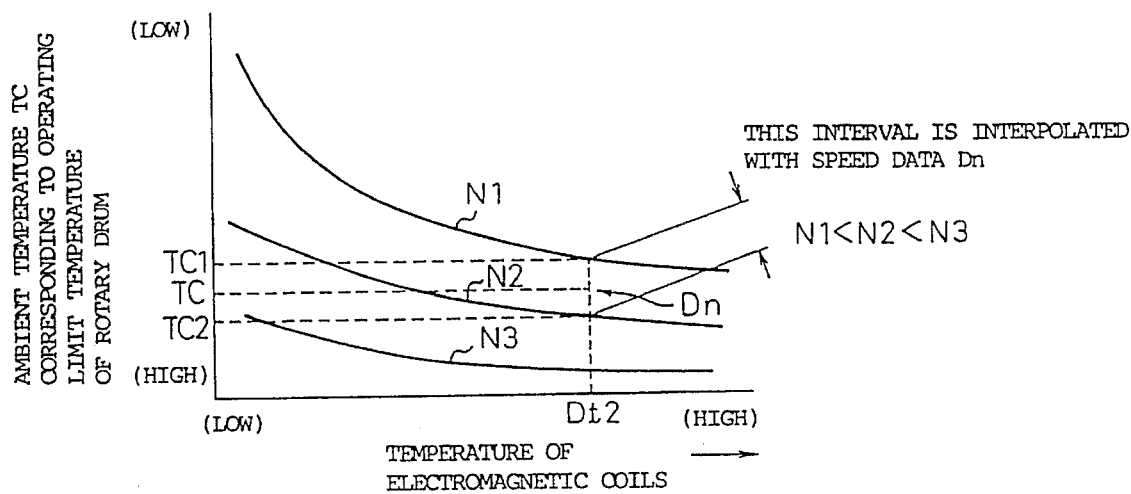
FIG. 10 is a graph showing temperature characteristics stored in a ROM according to the second embodiment of the invention of FIG. 8.

FIG. 10 shows temperature characteristic curves stored in the ROM, for estimating the actual temperature of the rotary drum. The abscissa represents the temperature of the electromagnetic coils and the ordinate represents the ambient temperature around the rotary drum and corresponding to an operating temperature limit of the rotary drum. This temperature is changed in accordance with the rotational speed of the rotary drum and the temperature of the electromagnetic coils.

For a plurality of typical rotational speeds N1, N2 and N3 (N1<N2<N3) of the rotary drum, model ambient temperatures around the rotary drum and temperatures of the electromagnetic coils are first measured when the rotary drum reaches its operating limit temperature of, for example, 550° C., and the measured values are stored in the table of data D13 in the ROM of the CPU.

Storing all data for all rotational speeds of the rotary drum greatly increases the required capacity of the memory, and therefore, the ambient temperature for a rotational speed other than the typical rotational speeds is estimated and interpolated, in accordance with typical rotational speeds higher and lower than the rotational speed in question, by using a proper correction means.

FIG. 10 shows temperature characteristic curves explaining the contents of the ROM of the second embodiment of the invention.

Referring to the table D13 of limit temperature data D13 of the rotary drum 33 stored in the ROM 37a, the CPU 38 finds the speed data Dn according to the operating temperature D12 of the electromagnetic coils 32, and if the speed data Dn is between N1 and N2, an interval between N1 and N2 is interpolated according to the speed data Dn. Namely, ambient temperatures TC1 and TC2 corresponding to the operating temperature limit are obtained from intersections between a vertical line extending from the temperature D12 of the electromagnetic coils 32 and curves for the rotational speeds N1 and N2 of the rotary drum. Thereafter, the interval between the temperatures TC1 and TC2 is interpolated according to the actual rotational speed Dn of the rotary drum, by using, for example, a linear interpolation or proportional dividing method, to thereby provide an ambient temperature TC corresponding to the operating temperature limit of the rotary drum for the rotational speed Dn.

Figure 11:
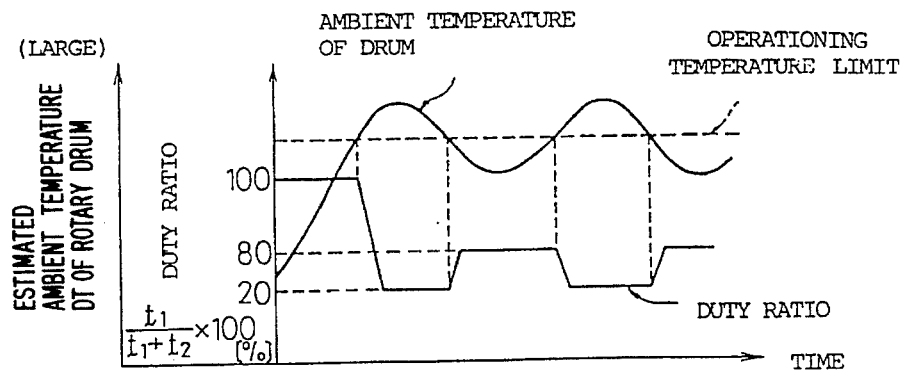
FIG. 11 is a control characteristics diagram showing the operation of a CPU according to the second embodiment of FIG. 8.

FIG. 11 shows control characteristic curves explaining an operation of the CPU according to the second embodiment of the invention.

In FIG. 11, the ordinate represents an ambient drum temperature DT and a duty ratio $\{t1/(t1+t2)\}\times 100$, and the abscissa represents time t. A reference mark TC denotes the ambient operating temperature limit from FIG. 10, and DT a drum ambient temperature.

The CPU 38 controls the duty ratio of the drive pulse P in response to the drum ambient temperature DT within the range of the ambient operating temperature limit TC. This duty ratio control is the same as that explained in detail with reference to FIG. 5.

Next, an operation of the brake will be explained.

The basic concept of the duty ratio control of this embodiment is the same as in the previous embodiment explained with reference to FIG. 5.

In addition to the control data of the previous embodiment, the duty ratio $t1/(t1+t2)$ is determined according to the drum rotational speeds N1, N2, and N3, drum ambient temperature data D15, operating temperature data D12 of the electromagnetic coils, and estimated operating temperature limit data DT of the drum. Namely, when the data D15 is lower than the limit operation temperature TC at the instant rotational speed, for example, when the data D15 is lower than DT at the rotational speed Dn, the CPU increases the effect of the electromagnetic brake by enlarging the duty ratio $t1/(t1+t2)$ of the drive pulse P, to thereby prolong the ON time of the pulse P. When the drum ambient temperature DT is increased, the CPU weakens the effect of the electromagnetic brake by reducing the duty ratio $t1/(t1+t2)$ of the drive pulse P, to thereby prolong the OFF time of the pulse P.

The drive pulse P having the duty ratio $t1/(t1+t2)$ is applied to gates of the switching transistors T1 to T8, and as result, coil currents I1 to I8 to the solenoids L1 to L8, respectively, are controlled according to the duty ratio $t1/(t1+t2)$. Since the drum 23 is rotated in magnetic fields produced by the electromagnetic coils 22, an eddy current flows in the drum 23 and generates Joule heat in the drum 23, to thereby produce a braking torque which is applied to the vehicle.

FIG. 11 shows a model of the duty ratio control of the second embodiment.

When the estimated value DT of the rotary drum ambient temperature exceeds the ambient operating temperature limit TC, or when the estimated value DT reaches the ambient operating temperature limit TC, while the current duty ratio is 100, the duty ratio is reduced to 20 to suppress heat in the rotary drum and lower the temperature below the ambient operating temperature limit TC. In this case, it is preferable not to suddenly change the duty ratio.

Once the ambient temperature DT of the rotary drum becomes lower than the ambient operating temperature limit TC, the duty ratio is again increased to permit increasing the temperature of the rotary drum. At this time, the duty ratio is not returned to 100 but is preferably stopped at, for example, 80. If the duty ratio is returned to 100, the estimated value DT of the rotary drum ambient temperature may quickly exceed the ambient operating temperature limit TC and this would require that the control be done frequently, which must be avoided.

In this way, the CPU 38 uses at least the speed data Dn, temperature data D12 and D15, and limit operation temperature data D13 to estimate the ambient operating temperature limit TC of the rotary drum 33, and provides the switching circuit 34 with the drive pulse P.

When the CPU 38 receives the speed data Dn, temperature data D12 and D15, and the operating temperature limit data D13 in the table corresponding to the driving condition such as running on a downward slope and the load on the vehicle, the CPU 38 provides the switching circuit 34 with the drive pulse P as the switching data D14, and according to the drive pulse P, the switching circuit 34 controls a controlled period of current flow to the eight solenoids L1 to L8.

Unlike the prior art, which individually opens the electric circuits of the eight solenoids L1 to L8, the invention keeps all circuits closed and carries out a stepless control of the braking torque such that the operating temperature of the rotary drum 33 does not reach the operating temperature limit TC.

As a result, loads on the electromagnetic coils 32 are averaged, and the temperature of any individual coil is not abnormally increased. Also, since a uniform temperature distribution is realized, the influence of the temperature on the periphery is minimized, and a predetermined shape of the rotary drum 33 is maintained.

Figure 12A:
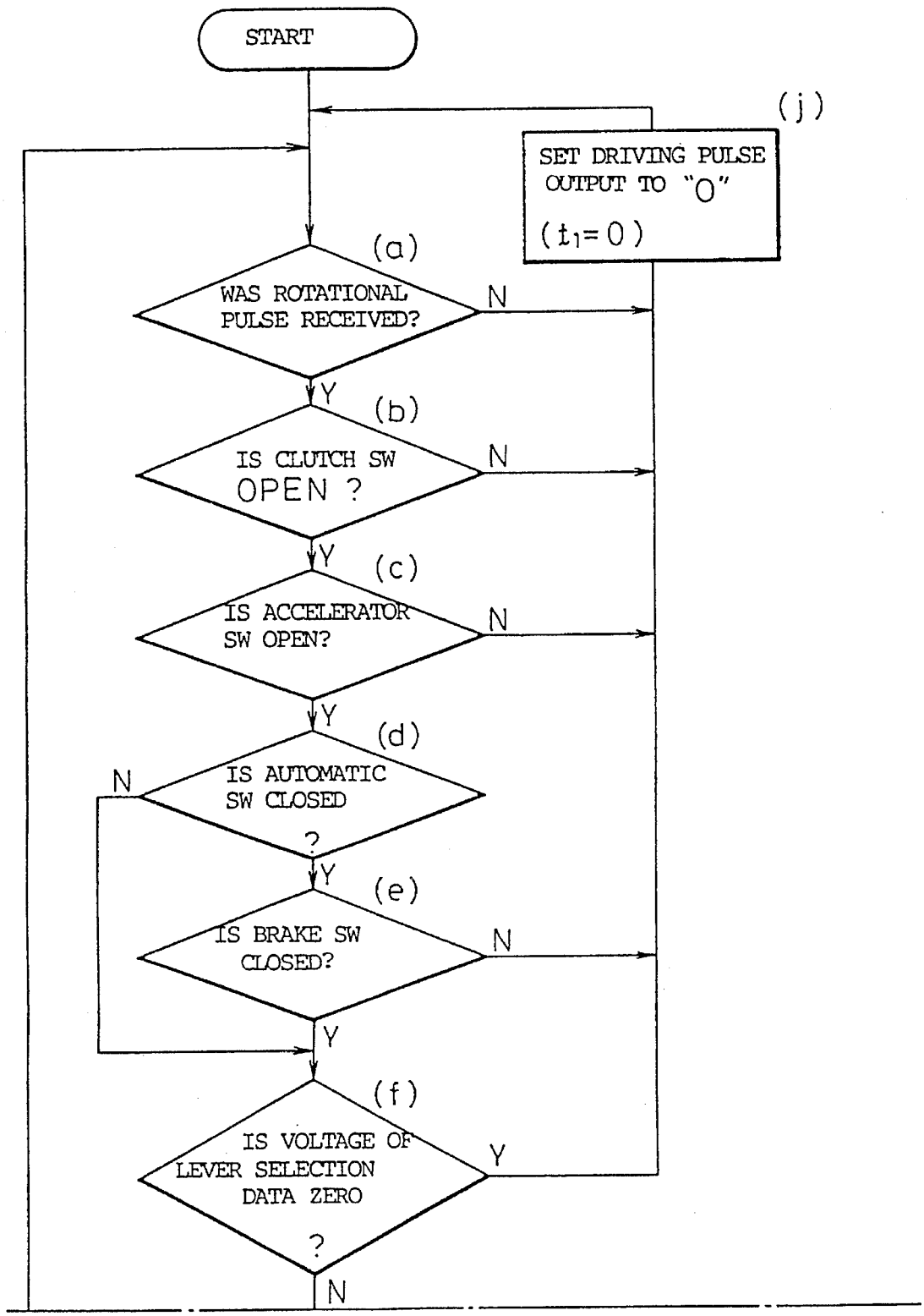
FIGS. 12(A) and 12(B), in the composite, are a flowchart showing the operation of a third embodiment of the invention.
Figure 12B:
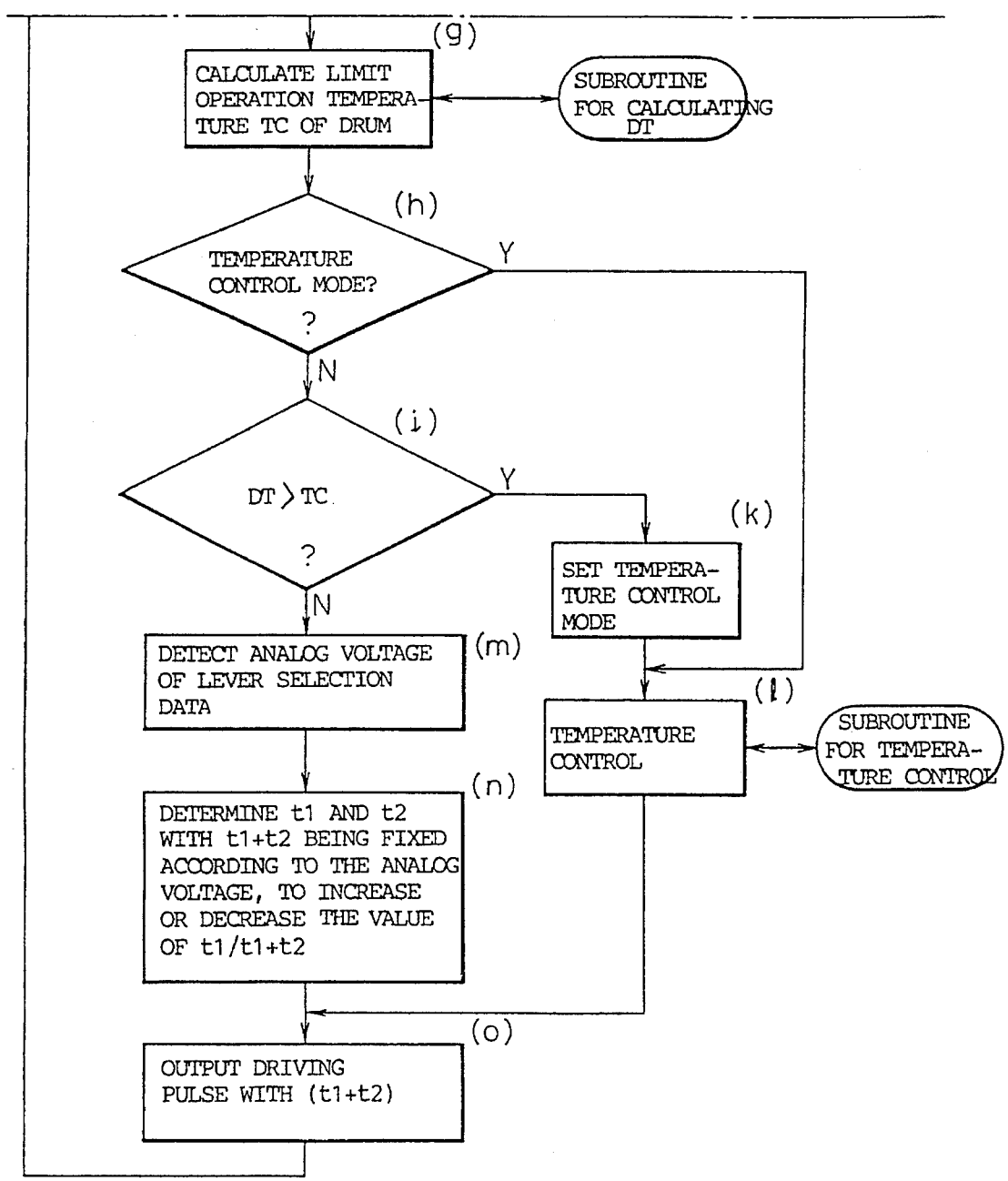

FIGS. 12(A) and 12(B), in the composite, comprise a flowchart showing an operation of the electromagnetic brake according to the third embodiment. Steps from the initiation to Step (f) are the same as those explained with reference to FIG. 7.

According to this embodiment, in Step (g), as explained above, the present ambient operating temperature limit TC of the rotary drum is estimated in accordance with the rotational speed Dn of the rotary drum, the temperature of the electromagnetic coils 32, and the table mentioned above.

Then, at Step (h) it is determined whether or not the temperature control mode is operative. If YES, Step (i) is carried out, and if NO, at Step (i) it is determined whether or not the detected present drum ambient temperature DT of the rotary drum is higher than the ambient operating temperature limit TC calculated in Step (g). If YES at Step (i), at Step (k) the temperature control mode is set, and at Step (l) a duty ratio for controlling the temperature of the rotary drum according to the temperature control mode is calculated. Then, at Step (o) a drive pulse having a predetermined duty ratio is provided.

Figure 7:
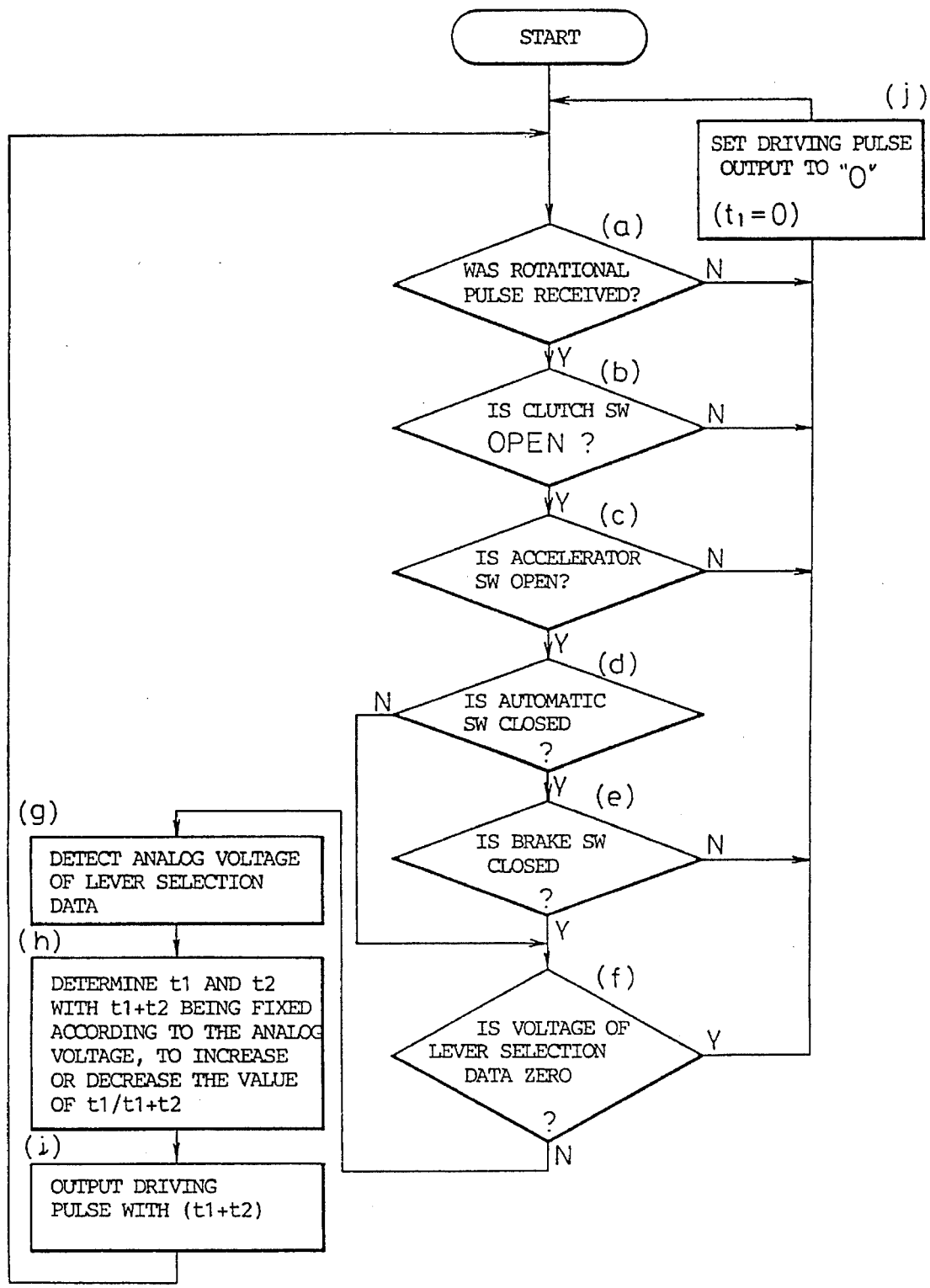
FIG. 7 is a flowchart showing an operation of the first embodiment of the invention.

If the result at Step (i) is NO, the same operations as in Steps (g) to (i) of FIG. 7 are carried out, at Steps (m) to (o).

Figure 13:
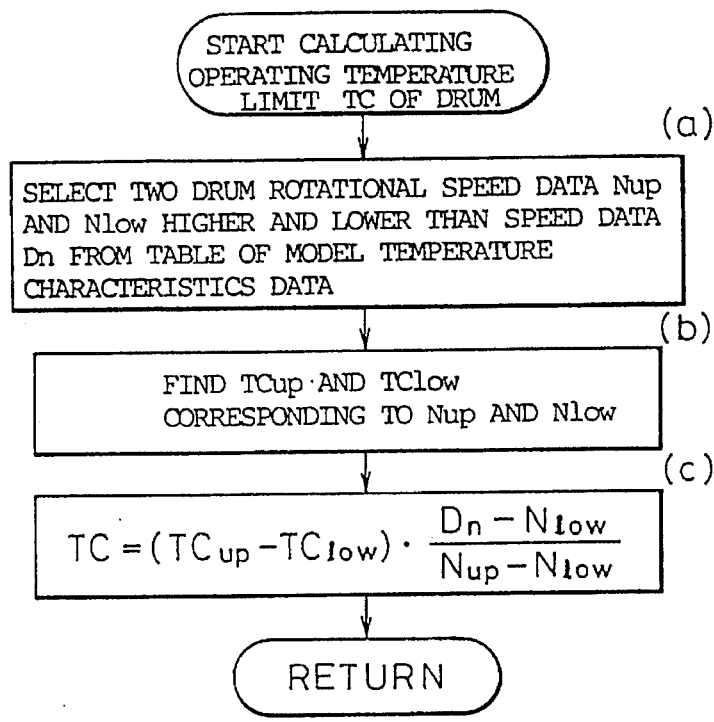
FIG. 13 is a flowchart showing an example of a routine for calculating an operating temperature limit of a rotor, used in the flowchart of FIGS. 12(A) and 12(B)

FIG. 13 shows an example of a routine for calculating the operating temperature limit TC used in Step (g) of the above control flow.

To obtain the present ambient operating temperature limit TC of the rotary drum according to the chart of FIG. 10, at Step (a), according to the present rotational speed Dn of the rotary drum, there are selected a graph indicating a rotational speed Nup which is higher than the present rotational speed Dn and a graph indicating a rotational speed Nlow which is lower than the operating present rotational speed Dn.

Thereafter, at Step (b), the limit temperatures TCup and TClow according to the graphs indicating the rotational speeds Nup and Nlow and the temperature of the electromagnetic coils corresponding to the graphs are found.

Finally, at Step (c), according to an equation shown in the figure, the ambient operating temperature limit TC corresponding to the present rotational speed D of the rotary drum is calculated.

Figure 14:
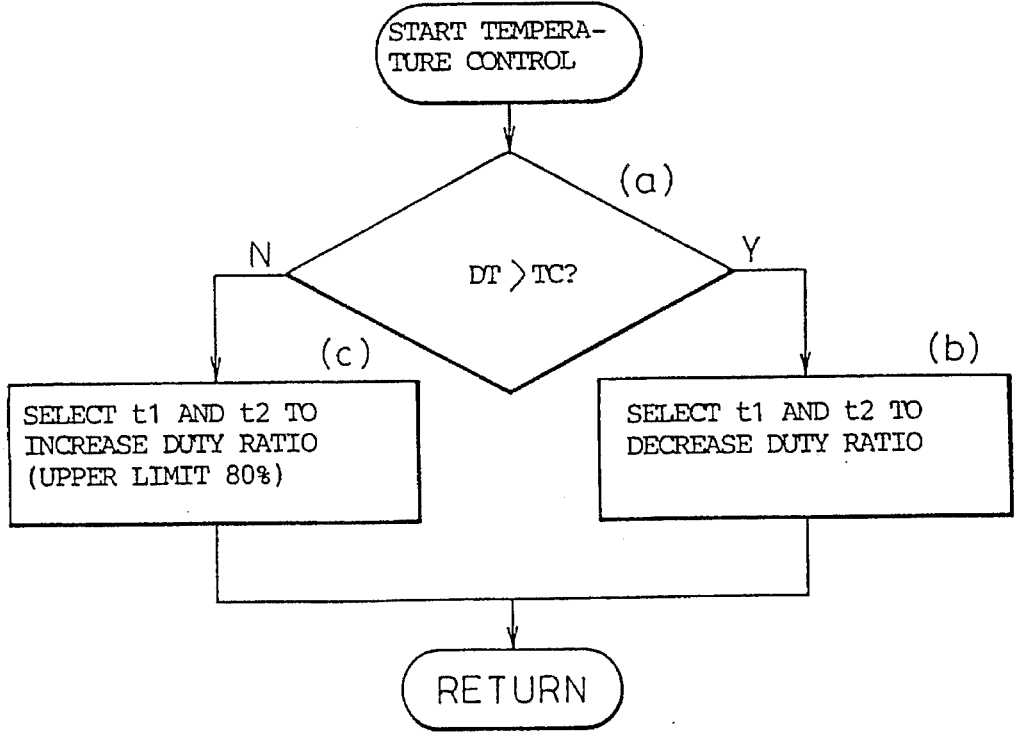
FIG. 14 is a flowchart showing an example of a temperature control mode of the flowchart of FIG. 12.

FIG. 14 shows an example of the temperature control mode used for the above control flow.

At Step (a) the present ambient temperature DT of the rotary drum is compared with the calculated ambient operating temperature limit TC, and if the present ambient temperature DT of the rotary drum is higher than the ambient operating temperature limit TC, at Step (b) an ON time t1 and OFF time t2 is selected so that the present duty ratio is lowered.

If the present ambient temperature DT of the rotary drum is lower than the limit temperature TC, at Step (c) an ON time t1 and OFF time t2 are selected such that the present duty ratio is increased.

CAPABILITY OF EXPLOITATION IN INDUSTRY

As explained above, the present invention provides a control means with external control data corresponding to a change in driving conditions, and controls the energizing period of the electromagnetic coils.

Unlike the prior art, which individually opens electric circuits of a plurality of solenoids within the operating temperature limit of a drum, the invention keeps all circuits closed and carries out a stepless control of the braking torque by using switching transistors.

The invention averages loads on the respective solenoids and maintains a low operating temperature of the solenoids.

Unlike the prior art, the invention does not use large capacity relays, and thus the weight of the brake is reduced. Further, the invention provides a highly stabilized electromagnetic brake having smooth braking characteristics.

The invention provides a control means with estimated ambient operating temperature limit data of a drum in response to a change in a driving condition such as when running on a downward slope, and automatically controls the energizing period of the electromagnetic coils.

Since the temperature of the drum is not excessively increased, it is not necessary to redundantly increase the heat capacity (weight) thereof to deal with severe operating conditions, and thus the invention provides the maximum braking torque within a operating temperature limit of the drum. Further, the invention provides an inexpensive method of measuring the temperature of the drum.

We claim:

1. An electromagnetic brake for generating a braking torque on a rotary drive shaft of a drive force supply unit, comprising:

a plurality of electromagnetic coils disposed in fixed relationship to the drive force supply unit, the coils being responsive to the flow of an energizing current therethrough for producing a corresponding magnetic field;

a rotor, made of a conductive material, and affixed to the rotary drive shaft for common rotation therewith and disposed relatively to said coils so as to rotate in the magnetic field produced thereby in response to the flow of energizing current therethrough, the rotation of the rotor in the magnetic field producing an eddy current in the rotor and the eddy current converting the rotational energy imparted to the rotor by the shaft into heat, thereby to generate the braking torque on the rotary drive shaft;

switching means connected to the electromagnetic coils for selectively and controllably supplying the flow of energizing current thereto; and control means, responsive to external control data, for generating and supplying switching data to the switching means and thereby to cause the switching means to selectively control the ON/OFF ratio of the flow of energizing current supplied by the switching means to the electromagnetic coils.

2. (A) An electromagnetic brake according to claim 1, wherein the external control data comprises at least one of brake data, clutch data, accelerator data, lever selection data, rotational speed data of the rotary shaft, coil temperature data, and rotor surface temperature data.

3. (A) An electromagnetic brake according to claim 2, further comprising:

speed detector means for detecting the rotational speed of the rotary shaft of the drive force supply unit and providing the rotational speed data of the external control data; and temperature detector means for detecting the temperature of the electromagnetic coils and providing the coil temperature data of the external data.

4. (A) An electromagnetic brake according to claim 3, further comprising:

temperature detector means for detecting the ambient temperature at the surface of the rotor and providing the rotor surface temperature data of the external control data.

\* \* \* \* \*

UNITED STATES PATENT AND TRADEMARK OFFICE
CERTIFICATE OF CORRECTION

PATENT NO. : 5,485,901
DATED : January 23, 1996
INVENTOR(S) : Hideo AKIMA et al.

It is certified that error appears in the above-indentified patent and that said Letters Patent is hereby corrected as shown below:

<u>Col. 1</u>, line 56, change "anti" to --and--.

<u>Col. 6</u>, line 46, change "to" to --of--.

<u>Col. 7</u>, line 6, change "LB" to --L8--; and
   line 25, delete "10".

<u>Col. 8</u>, line 33, delete "a".

<u>Col. 9</u>, line 33, delete "second";
   line 35, after "This" insert --second--; and
   line 36, after "The" insert --second--.

<u>Col. 11</u>, line 11, delete "D13".

<u>Col. 12</u>, line 32, change "in" to --of--

UNITED STATES PATENT AND TRADEMARK OFFICE
CERTIFICATE OF CORRECTION

PATENT NO. : 5,485,901
DATED : January 23, 1996
INVENTOR(S) : Hideo Akima et al.

Page 2 of 2

It is certified that error appears in the above-indentified patent and that said Letters Patent is hereby corrected as shown below:

<u>Col. 13</u>, line 18, delete "operating"; and
     line 19, after "the" insert --operating--.
<u>Col. 14</u>, line 7, change "the" (second occurrence) to --a--.
     line 8, change "a" to --the--;
Claims  line 40, delete "(A)";
     line 45, delete "(A)"; and
     line 54, delete "(A)".

Signed and Sealed this

Twenty-first Day of May, 1996

Attest:

BRUCE LEHMAN

*Attesting Officer*     *Commissioner of Patents and Trademarks*